US010718903B1

(12) United States Patent
Bian et al.

(10) Patent No.: US 10,718,903 B1
(45) Date of Patent: Jul. 21, 2020

(54) WAVEGUIDE CROSSINGS WITH A NON-CONTACTING ARRANGEMENT

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/441,755

(22) Filed: Jun. 14, 2019

(51) Int. Cl.
*G02B 6/125* (2006.01)
*G02B 6/136* (2006.01)
*G02B 6/12* (2006.01)

(52) U.S. Cl.
CPC .............. *G02B 6/125* (2013.01); *G02B 6/136* (2013.01); *G02B 2006/12038* (2013.01); *G02B 2006/12061* (2013.01); *G02B 2006/12119* (2013.01)

(58) Field of Classification Search
CPC .................... G02B 6/125; G02B 6/136; G02B 2006/12038; G02B 2006/12119; G02B 2006/12061
See application file for complete search history.

(56) References Cited

U.S. PATENT DOCUMENTS

| | | | | |
|---|---|---|---|---|
| 6,920,266 | B2 * | 7/2005 | Blume | G02B 6/1228 385/28 |
| 8,503,839 | B2 * | 8/2013 | Cheben | G02B 6/107 385/31 |
| 8,861,902 | B2 * | 10/2014 | Bontempi | G02B 6/12004 385/129 |
| 9,709,738 | B1 | 7/2017 | Dumais | |
| 2005/0213873 | A1 | 9/2005 | Piede et al. | |
| 2013/0108208 | A1 | 5/2013 | Doerr | |
| 2017/0254951 | A1 | 9/2017 | Dumais et al. | |

OTHER PUBLICATIONS

Jones et al., "Ultra-low crosstalk, CMOS compatible waveguide crossings for densely integrated photonic interconnection networks", © 2013 Optical Society of America.
Shang et al., "Low-loss compact multilayer silicon nitride platform for 3D photonic integrated circuits", ©2015 Optical Society of America.
Zhang et al., "A compact and low loss Y-junction for submicron silicon waveguide" ©2013 Optical Society of America.

* cited by examiner

Primary Examiner — Ryan A Lepisto
(74) Attorney, Agent, or Firm — Thompson Hine LLP; Anthony Canale

(57) ABSTRACT

Structures for a waveguide bend and methods of fabricating a structure for a waveguide bend. A first waveguide core has a first section, a second section, and a first waveguide bend connecting the first section with the second section. The first waveguide core has a first side surface extending about an outer radius of the first waveguide bend. A second waveguide core also has a first section, a second section, and a second waveguide bend connecting the first section with the second section. The second waveguide core has a second side surface extending about an outer radius of the second waveguide bend. The first waveguide bend is spaced from the second waveguide bend in a first non-contacting relationship with a gap between the first side surface and the second side surface. The gap has a perpendicular distance selected to permit optical signal transfer between the first and second waveguide bends.

18 Claims, 6 Drawing Sheets

WAVEGUIDE CROSSINGS WITH A NON-CONTACTING ARRANGEMENT

BACKGROUND

The present invention relates to photonics chips and, more specifically, to structures for a waveguide crossing and methods of fabricating a structure for a waveguide crossing.

Photonics chips are used in many applications and systems including, but not limited to, data communication systems and data computation systems. A photonics chip integrates optical components, such as waveguides, optical switches, directional couplers, and bends, and electronic components, such as field-effect transistors, into a unified platform. Among other factors, layout area, cost, and operational overhead may be reduced by the integration of both types of components on the same chip.

A waveguide crossing is building block used in photonics chips to provide paths for propagating optical signals. A waveguide crossing is an optical element in which two waveguide cores in a single layer intersect and directly cross. An ideal waveguide crossing may be designed with measures (e.g., shaping) to provide high transmission in each straight path and low crosstalk to the corresponding crossing path. However, despite these measures, directly-crossing waveguide cores may unwantedly exhibit scattering, crosstalk, and multi-mode excitation. In addition, directly-crossing waveguide crossings possess large footprints that may hamper dense integration in a photonics chip.

Improved structures for a waveguide crossing and methods of fabricating a structure for a waveguide crossing are needed.

SUMMARY

In an embodiment of the invention, a structure includes a first waveguide core having a first section, a second section, and a first waveguide bend connecting the first section with the second section. The first waveguide core has a first side surface extending about an outer radius of the first waveguide bend. The structure further includes a second waveguide core also having a first section, a second section, and a second waveguide bend connecting the first section with the second section. The second waveguide core has a second side surface extending about an outer radius of the second waveguide bend. The first waveguide bend is spaced from the second waveguide bend in a first non-contacting relationship with a gap between the first side surface and the second side surface. The gap has a perpendicular distance selected to permit optical signal transfer between the first waveguide bend and the second waveguide bend.

In an embodiment of the invention, a method includes patterning a layer with lithography and etching processes to form a first waveguide bend of a first waveguide core and a second waveguide bend of a second waveguide core. The first waveguide core has a first side surface extending about an outer radius of the first waveguide bend, and the second waveguide core having a second side surface extending about an outer radius of the second waveguide bend. The first waveguide bend is spaced from the second waveguide bend in a first non-contacting relationship with a gap between the first side surface and the second side surface. The gap has a perpendicular distance selected to permit optical signal transfer between the first waveguide bend and the second waveguide bend.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
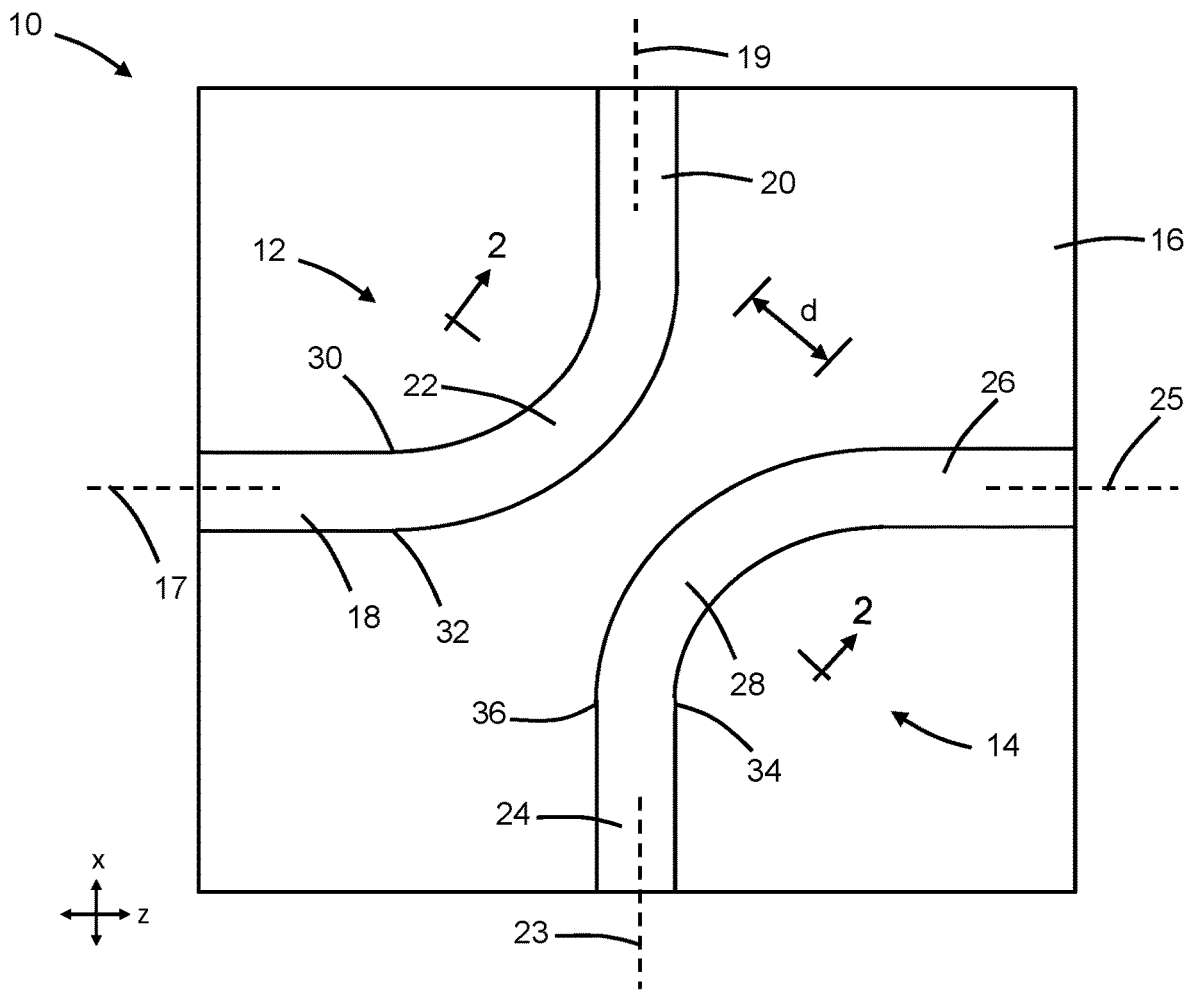
FIG. 1 is a diagrammatic top view of a structure at an initial fabrication stage of a processing method in accordance with embodiments of the invention.
Figure 2:
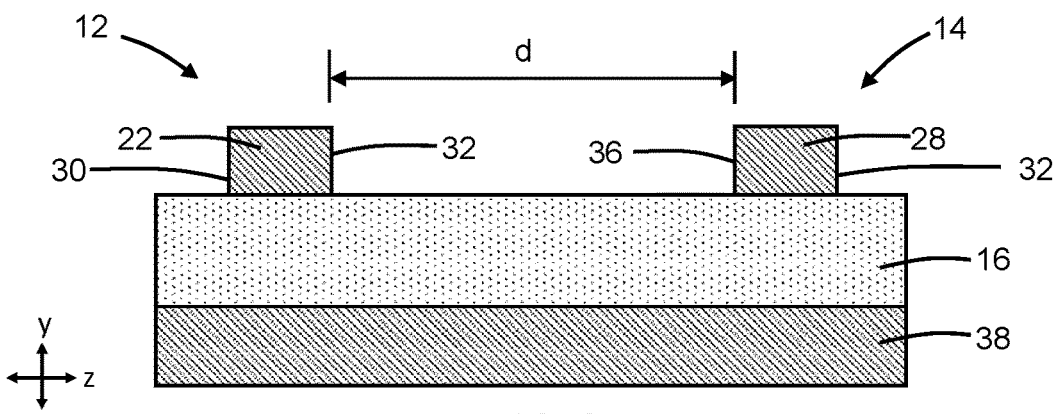
FIG. 2 is a cross-sectional view taken generally along line 2-2 in FIG. 1.

With reference to FIGS. 1, 2 and in accordance with embodiments of the invention, a structure 10 includes a waveguide core 12 and a waveguide core 14 that are arranged over a dielectric layer 16. The waveguide core 12 has a section 18 that extends along a longitudinal axis 17, section 20 that extends along a longitudinal axis 19, and a waveguide bend 22 extending along a curved centerline and effectively providing another section connecting the section 18 with the section 20. The longitudinal axis 17 of the section 18 of the waveguide core 12 is angled or inclined at an angle relative to the longitudinal axis 19 of the section 20 of the waveguide core 12 due to a change in direction provided by the waveguide bend 22. The waveguide core 14 has a section 24 that extends along a longitudinal axis 23, section 26 that extends along a longitudinal axis 25, and a waveguide bend 28 extending along a curved centerline and effectively providing another section connecting the section 24 with the section 26. The longitudinal axis 23 of the section 24 of the waveguide core 14 is angled or inclined at an angle relative to the longitudinal axis 25 of the section 26 of the waveguide core 14 due to a change in direction provided by the waveguide bend 28.

The waveguide core 12 includes sidewalls in the form of side surfaces 30, 32 that project in a vertical direction from the dielectric layer 16. The side surfaces 30, 32 may be substantially planar or straight over the sections 18, 20 of the waveguide core 12, and the side surfaces 30, 32 are non-planar or curved over the waveguide bend 22 of the waveguide core 12. The side surface 30 of the waveguide core 12 is arranged at the inner radius of the waveguide bend 22, and the side surface 32 of the waveguide core 12 is arranged at the outer radius of the waveguide bend 22.

The waveguide core 14 includes sidewalls in the form of side surfaces 34, 36 that project in a vertical direction from the dielectric layer 16. The side surfaces 34, 36 may be substantially planar or straight over the sections 24, 26 of the waveguide core 14, and the side surfaces 30, 32 are non-planar or curved over the waveguide bend 28 of the waveguide core 14. The side surface 34 is arranged at the inner radius of the waveguide bend 28, and the side surface 36 is arranged at the outer radius of the waveguide bend 28. The waveguide bend 22 is convex at the outer side surface 32, and the waveguide bend 28 is convex at the outer side surface 36. The waveguide bend 22 is arranged along the length of the waveguide core 12 arranged adjacent to the waveguide bend 28 of the waveguide core 14.

The longitudinal axis 17 of the section 18 of the waveguide core 12 may be aligned substantially collinear with the longitudinal axis 25 of the section 26 of the waveguide core 14. Similarly, the longitudinal axis 19 of the section 20 of the waveguide core 12 may be aligned substantially collinear with the longitudinal axis 23 of the section 24 of the waveguide core 14.

The waveguide cores 12, 14 may be composed of a single-crystal semiconductor material, such as single-crystal silicon and, in particular, single-crystal silicon originating from a device layer of a silicon-on-insulator (SOI) wafer. The silicon-on-insulator wafer further includes a buried insulator layer composed of a dielectric material, such as silicon dioxide, that provides the dielectric layer 16 and a substrate 38 composed of a single-crystal semiconductor material, such as single-crystal silicon, under the buried insulator layer. The waveguide cores 12, 14 may be patterned from a layer of single-crystal semiconductor material (e.g., the device layer of the SOI wafer) by lithography and etching processes during front-end-of-line processing.

The waveguide cores 12, 14 have the form of rib waveguides, as shown in the representative embodiment, in which the layer of single-crystal semiconductor material is fully etched to expose the dielectric layer 16 about the waveguide cores 12, 14. Alternatively, the waveguide cores 12, 14 have the form of ridge waveguides in which the layer of single-crystal semiconductor material is only partially etched such that a thin web of material covers the dielectric layer 16 surrounding the waveguide cores 12, 14. The waveguide cores 12, 14 may be composed of a different material, such as silicon nitride or polysilicon.

In an embodiment, the waveguide bend 22 may be curved with a central angle that is a right angle to provide a 90° change in direction such that the longitudinal axes 17, 19 are perpendicular. In an embodiment, the waveguide bend 28 may be curved with a central angle that is a right angle to provide a 90° change in direction such that the longitudinal axes 23, 25 are perpendicular. However, a non-right angle curvature may be chosen for one or both of the waveguide bends 22, 28 to provide a change of direction characterized by a different angular inclination.

The shape of the waveguide bends 22, 28 may be characteristic of a sector of an annulus in which the arc lengths of each waveguide bend 22, 28 at its inner and outer radii are arcs representing part of the circumference of respective circles having a constant curvature. In alternative embodiments, the waveguide bends 22, 28 may be shaped according to another type of curve, such as a curve with a complex curvature that is described by an equation or formula such as a sine function, a cosine function, a spline function, an Euler spiral function, etc., that provides an adiabatic bend that lacks a constant curvature. In an embodiment, the curvature of the waveguide bend 22 may be equal or identical to the curvature of the waveguide bend 28. In an alternative embodiment, the waveguide bend 22 may have a curvature that is not equal to the curvature of the waveguide bend 28.

Optical signals may be transferred between the waveguide cores 12, 14 over a coupling region between the waveguide bends 22, 28 through evanescent coupling. The proximity of the waveguide bend 22 to the waveguide bend 28 permits arriving optical signals propagating in the section 18 of the waveguide core 12 to be transferred to the section 26 of the waveguide core 14. The proximity of the waveguide bend 22 to the waveguide bend 28 permits arriving optical signals propagating in the section 24 of the waveguide core 14 to be transferred to the section 20 of the waveguide core 12. In an embodiment, the respective transfers may be full or complete transfers with minimal loss or crosstalk such that the waveguide cores 12, 14 effectively provide a waveguide crossing in which the waveguide cores 12, 14 do not physically cross.

The gap between the side surface 32 at the outer radius of the waveguide bend 22 and the side surface 36 at the outer radius of the waveguide bend 28 is provided with a gap distance, d, that is selected to promote optical signal transfer. In this manner, the waveguide bends 22, 28 effectively function as a non-contact waveguide crossing. The gap distance, d, may be wavelength dependent and represents a distance of closest approach for the side surfaces 32, 36. The gap distance may be a perpendicular distance from the side surface 32 at the outer radius of the waveguide bend 22 to the side surface 36 at the outer radius of the waveguide bend 28 measured along a line that is perpendicular to both of the side surfaces 32, 36. In an embodiment, the gap distance may range, in terms of wavelength ($\lambda$) of the guided optical signal, from $0.03*\lambda$ to $2*\lambda$. For example, optical signals having a wavelength of 1310 nm may be efficiently transferred for a gap distance of about 76 nm. The gap distance is less than conventional gap distances between bends that are intentionally selected to prevent the occurrence of evanescent coupling and optical signal transfer.

Figure 3:
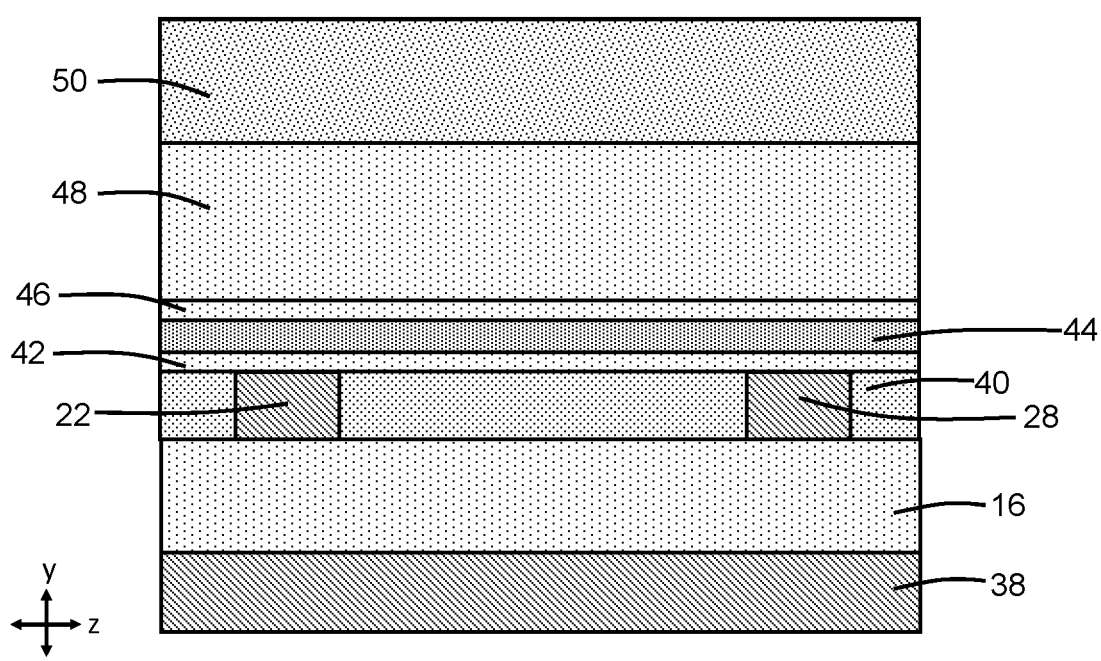
FIG. 3 is a cross-sectional view of the structure at a fabrication stage of the processing method subsequent to FIG. 2.

With reference to FIG. 3 in which like reference numerals refer to like features in FIG. 2 and at a subsequent fabrication stage, dielectric layers 40, 42, 44, 46 composed of respective dielectric materials are sequentially formed in a layer stack over the waveguide cores 12, 14. In the layer stack, the dielectric layer 40 is arranged over the dielectric layer 16 and the waveguide cores 12, 14, the dielectric layer 42 is arranged over the dielectric layer 40, the dielectric layer 44 is arranged over the dielectric layer 42, and the dielectric layer 46 is arranged over the dielectric layer 44. The waveguide cores 12, 14 are embedded or buried in the dielectric material of the dielectric layer 40, which acts as lateral cladding. In particular, the dielectric material of the dielectric layer 40 is located in the gap between the side surface 32 at the outer radius of the waveguide bend 22 and the side surface 36 at the outer radius of the waveguide bend 28.

The dielectric layer 40 may be composed of a dielectric material, such as silicon dioxide, deposited by chemical vapor deposition and planarized with, for example, chemical mechanical polishing to remove topography. The dielectric layer 42 may be composed of dielectric material, such as silicon dioxide, deposited by chemical vapor deposition or atomic layer deposition over the dielectric layer 40. The dielectric layer 44 may be composed of dielectric material, such as silicon nitride, deposited by chemical vapor deposition or atomic layer deposition over the dielectric layer 42. The dielectric layer 46 may be composed of dielectric material, such as silicon dioxide, deposited by chemical vapor deposition or atomic layer deposition over the dielectric layer 44. The dielectric layers 42, 44, 46 may be planar layers arranged in the layer stack over the planarized top surface of the dielectric layer 40.

A dielectric layer 48 of a contact level is formed by middle-of-line processing over the dielectric layer 46. The dielectric layer 48 may be composed of dielectric material, such as silicon dioxide, deposited by chemical vapor deposition using ozone and tetraethylorthosilicate (TEOS) as reactants.

A back-end-of-line stack, generally indicated by reference numeral 50, is formed by back-end-of-line processing over the dielectric layer 48 and the structure 10. The back-end-of-line stack 50 may include one or more interlayer dielectric layers composed of one or more dielectric materials, such as a carbon-doped silicon oxide, and metallization composed of, for example, copper, tungsten, and/or cobalt that is arranged in the one or more interlayer dielectric layers.

In alternative embodiments, the waveguide cores 12, 14 may be composed of a different material, such as polysilicon or silicon nitride.

The waveguide cores 12, 14 may provide a non-contact waveguide crossing that has increased compactness to provide a reduced footprint relative to common directly-crossed waveguide crossings. The reduction in the footprint may be achieved without sacrificing crosstalk or insertion loss by adjusting, among other factors, the gap distance of the gap between the waveguide bends 22, 28.

Figure 4:
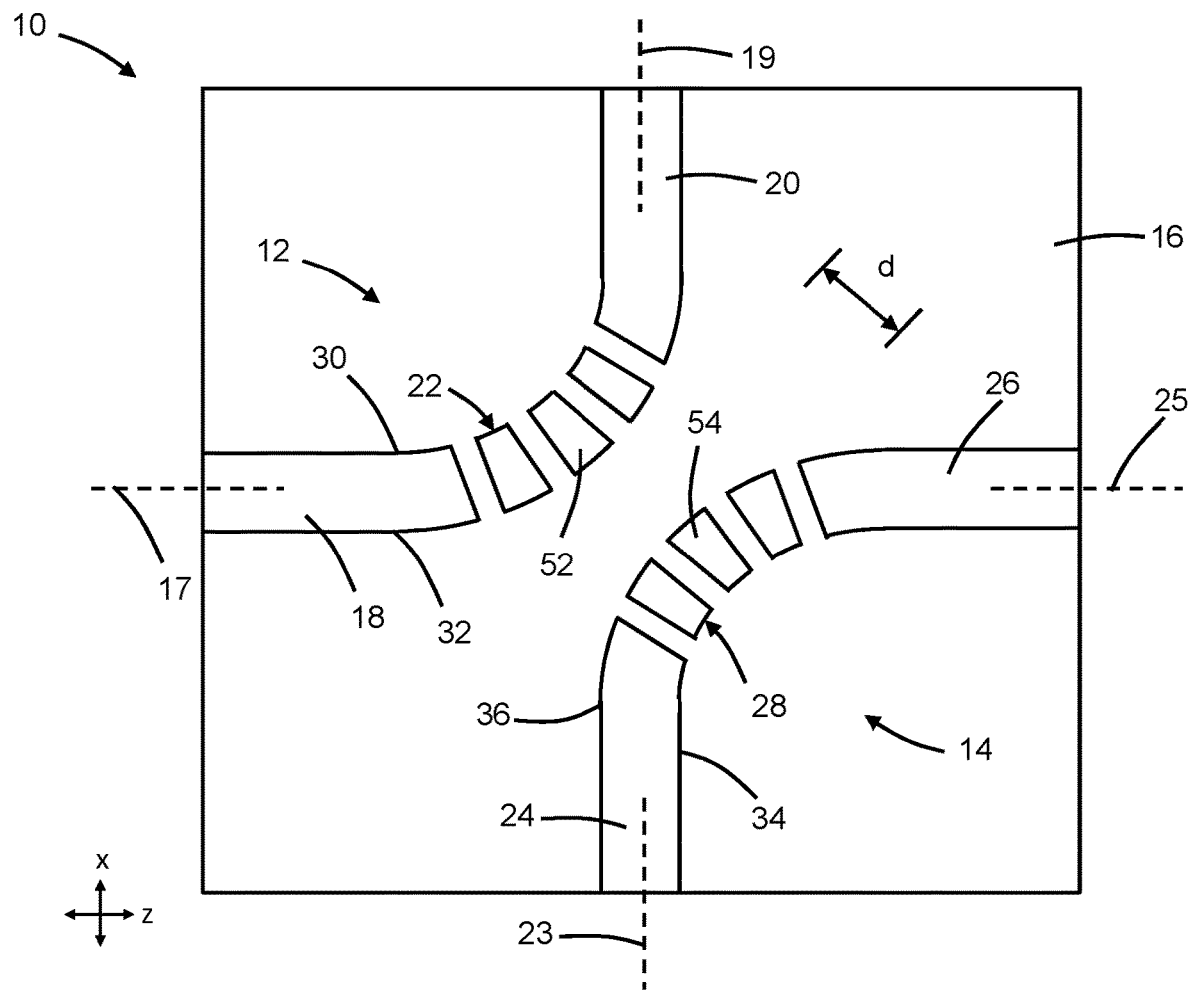
FIGS. 4-7 are top view of structures in accordance with alternative embodiments of the invention.

With reference to FIG. 4 and in accordance with alternative embodiments of the invention, the waveguide bend 22 may be patterned during the lithography and etching processes forming the waveguide core 12 to provide a plurality of segments 52 separated by slots extending fully from side surface 30 to side surface 32. Similarly, the waveguide bend 28 may be patterned during the lithography and etching processes forming the waveguide core 14 to provide a plurality of segments 54 separated by slots extending fully from side surface 34 to side surface 36. The waveguide core 12 is discontinuous over the segmented waveguide bend 22, and the waveguide core 14 is also discontinuous over the segmented waveguide bend 28. The dielectric material of the dielectric layer 40 is located in the slots between the segments 52 of the waveguide bend 22 and in the slots between the segments 52 of the waveguide bend 28.

Figure 5:
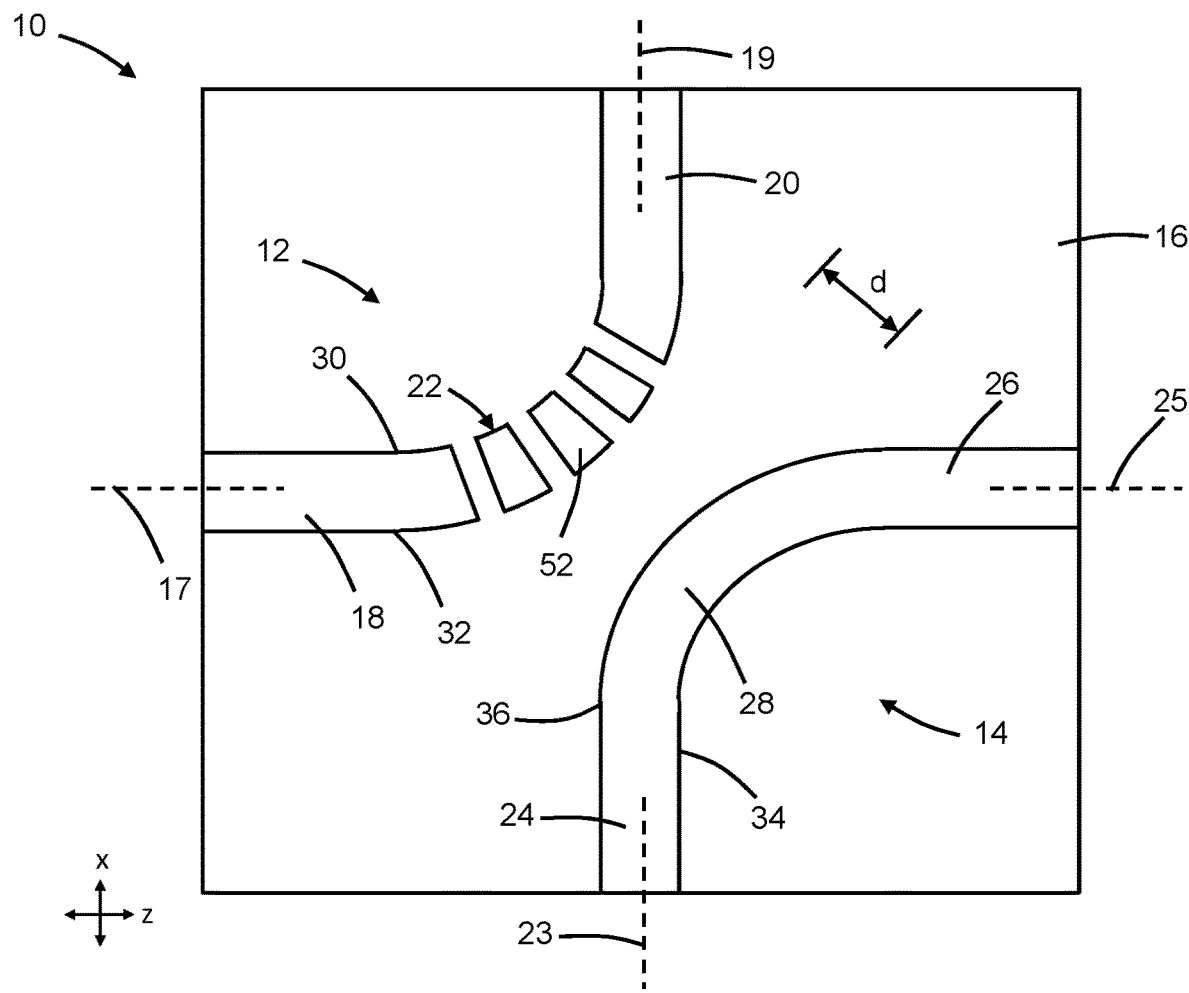

With reference to FIG. 5 and in accordance with alternative embodiments of the invention, the waveguide bend 28 may include the segments 54 and the waveguide bend 22 may be continuous and therefore lack the segments 52 to provide a composite structure 10 in which the waveguide bend 28 is segmented and the waveguide bend 22 is not segmented. This provides a composite structure in which the waveguide bends 22, 28 are structurally different.

Figure 6:
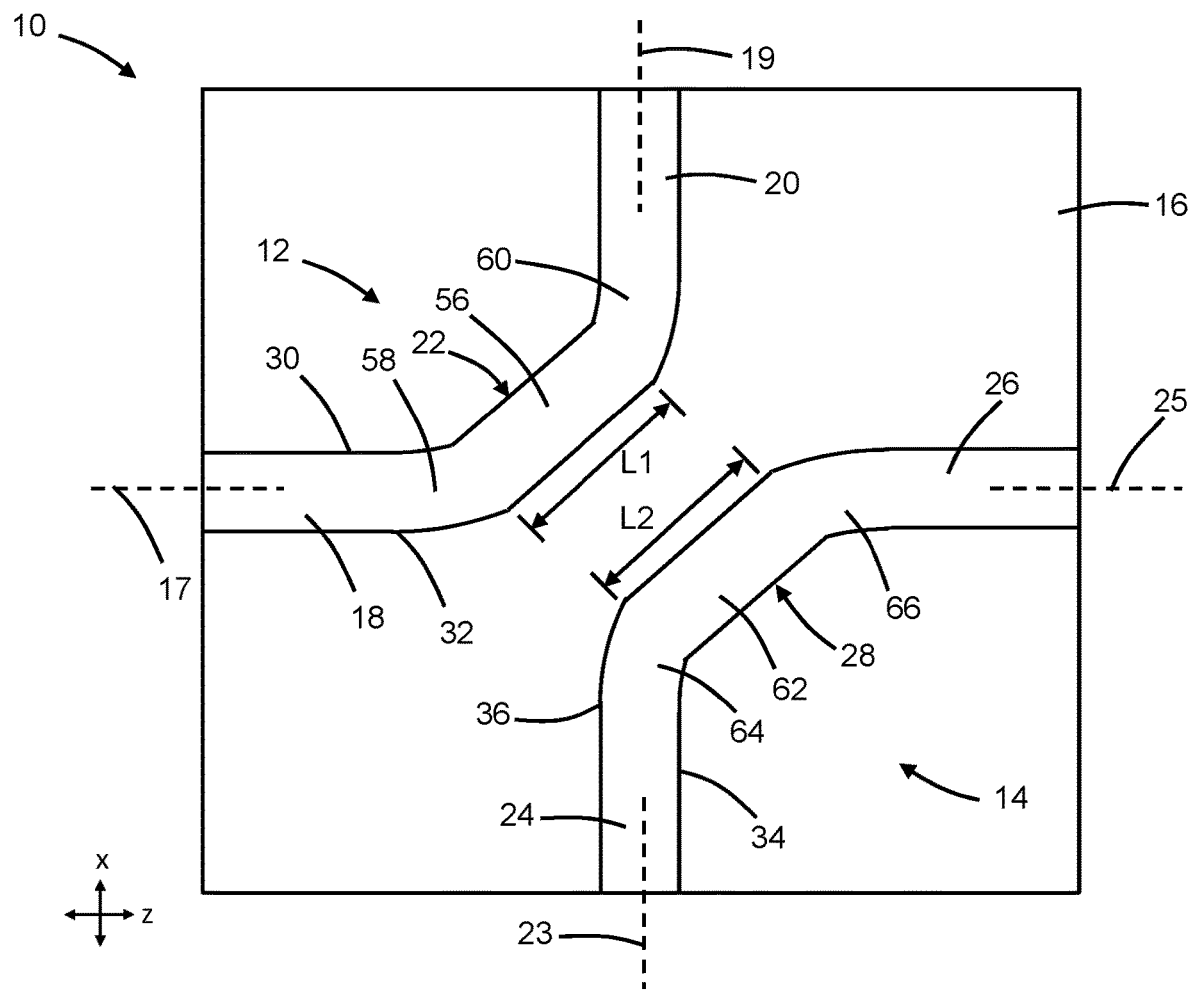

With reference to FIG. 6 and in accordance with alternative embodiments of the invention, the waveguide bend 22 may be modified to add a section 56 that is non-curved and that interrupts its continuous curvature. The waveguide bend 22 includes a curved section 58 connecting the section 56 with the section 18 of the waveguide core 12 and a curved section 60 connecting the section 56 with the section 20 of the waveguide core 12. The section 56 connects the curved sections 58, 60 and is arranged between the curved section 58 and the curved section 60. The curved sections 58, 60 collectively provide the change in direction between the section 18 and the section 20 of the waveguide core 12.

The waveguide bend 28 may also be modified to add a section 62 that is non-curved and that interrupts its continuous curvature. The waveguide bend 28 includes a curved section 64 connecting the section 62 with the section 24 of the waveguide core 14 and a curved section 66 connecting the section 56 with the section 26 of the waveguide core 14. The section 62 connects the curved sections 64, 66 and is arranged between the curved section 64 and the curved section 66. The curved sections 64, 66 collectively provide the change in direction between the section 24 and the section 26 of the waveguide core 14.

In an embodiment, the section 56 of the waveguide bend 22 and the section 62 of the waveguide bend 28 may be substantially planar or straight, and may be separated by a gap having the perpendicular distance, d. The section 56 of the waveguide bend 22 may have a length, L1, and the section 62 of the waveguide bend 28 may have a length, L2.

In an embodiment, the lengths of the sections 56 and 62 may be substantially equal. In an embodiment, one or both of the sections 56, 62 may be segmented.

In an embodiment, the lengths of the sections 56 and 62 may be unequal, which may introduce a phase delay proportional to the length difference. The structure 10 with sections 56, 62 of different length may operate as an optical coupler in which the arriving optical signals in section 18 of the waveguide core 12 may be split between the section 20 of the waveguide core 12 and the section 26 of the waveguide core 14, and the arriving optical signals in section 24 of the waveguide core 14 may be split between the section 20 of the waveguide core 12 and the section 26 of the waveguide core 14. The ratio of the lengths of the sections 56, 62 may determine the split ratio.

The structure 10, in any of the embodiments described herein, may be integrated into a photonics chip that includes electronic components and additional optical components formed on the same chip. For example, the electronic components may include field-effect transistors that are fabricated by CMOS front-end-of-line (FEOL) processing.

Figure 7:
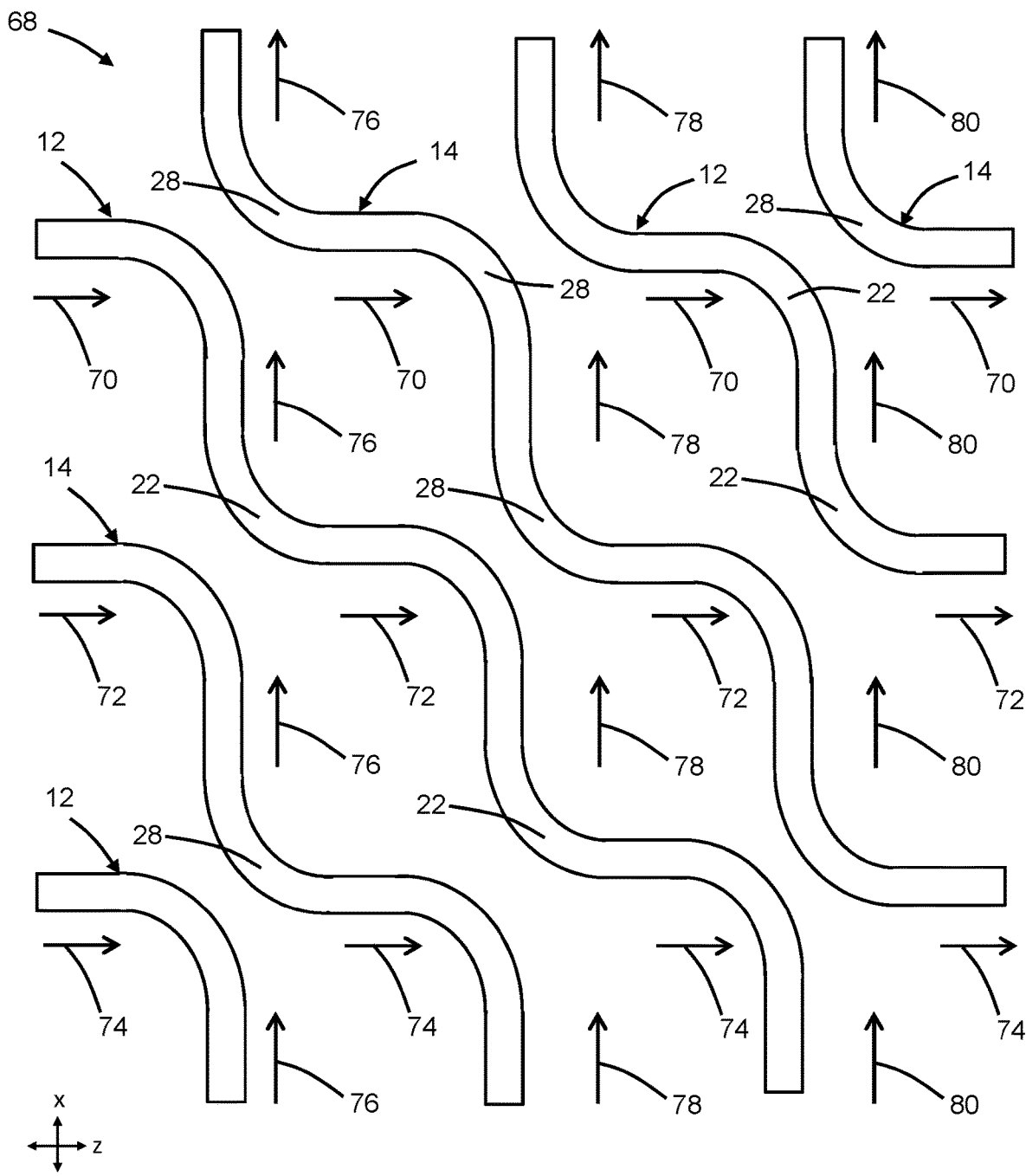

With reference to FIG. 7 and in accordance with alternative embodiments of the invention, the structure 10 of any of the embodiments may be used to fabricate an array 68 of non-contact waveguide crossings that include multiple waveguide cores 12, 14 and multiple instances of the adjacent waveguide bends 22, 28. The waveguide bends 22, 28 alternate in direction to facilitate the transfer of optical signals across the array 68. In particular, optical signals can be transmitted in paths 70, 72, 74 across the array 68 in one direction in a plane (e.g., the z-direction in an x-z plane), and optical signals can be transmitted in paths 76, 78, 80 across the array 68 in an orthogonal direction in the plane (e.g., the x-direction in an x-z plane).

Along the length of each waveguide core 12, the waveguide bends 22 have a periodic arrangement and alternate in the directional change (i.e., clockwise and counterclockwise). Along the length of each waveguide core 14, the waveguide bends 28 have a periodic arrangement and alternate in the directional change (i.e., clockwise and counterclockwise). Adjacent waveguide bends 22 of each waveguide core 12 provide two curves bent in opposite directions arranged on opposite sides of a common section 18 or a common section 20. Adjacent waveguide bends 28 of each waveguide core 14 provide two curves bent in opposite directions arranged on opposite sides of a common section 24 or a common section 26.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or "in direct contact with" another feature if intervening features are absent. A feature may be "indirectly on" or "in indirect contact with" another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first waveguide core including a first section, a second section, and a first waveguide bend connecting the first section with the second section, the first waveguide core having a first side surface extending about an outer radius of the first waveguide bend; and
   a second waveguide core including a first section, a second section, and a second waveguide bend connecting the first section with the second section, the second waveguide core having a second side surface extending about an outer radius of the second waveguide bend,
   wherein the first section of the first waveguide core is substantially straight and aligned along a first longitudinal axis, the first section of the second waveguide core is substantially straight and aligned along a first longitudinal axis, the first longitudinal axis of the first waveguide core is substantially collinear with the first longitudinal axis of the second waveguide core, the first waveguide bend is spaced from the second waveguide bend in a first non-contacting relationship with a first gap between the first side surface and the second side surface, and the first gap has a perpendicular distance selected to permit optical signal transfer between the first waveguide bend and the second waveguide bend.

2. The structure of claim 1 wherein the first waveguide bend includes a first plurality of segments arranged in a first curved arc.

3. The structure of claim 2 wherein the second waveguide bend includes a second plurality of segments arranged in a second curved arc.

4. The structure of claim 2 wherein the first plurality of segments are separated by spaces, and the spaces are filled by a dielectric material.

5. The structure of claim 1 wherein the first side surface of the first waveguide bend of the first waveguide core is convexly curved, and the first side surface of the first waveguide bend of the second waveguide core is convexly curved.

6. The structure of claim 1 wherein the second section of the first waveguide core is substantially straight and aligned along a second longitudinal axis, the second section of the second waveguide core is substantially straight and aligned along a second longitudinal axis, and the second longitudinal axis of the first waveguide core is substantially collinear with the second longitudinal axis of the second waveguide core.

7. The structure of claim 6 wherein the first longitudinal axis of the first waveguide core is angled at a first angle relative to the second longitudinal axis of the first waveguide core, and the first longitudinal axis of the second waveguide core is angled at a second angle relative to the second longitudinal axis of the second waveguide core.

8. The structure of claim 7 wherein the first angle is a right angle, and the second angle is a right angle.

9. The structure of claim 1 wherein the first waveguide bend of the first waveguide core includes a first curved section, a second curved section, and a first non-curved section connecting the first curved section with the second curved section, and the first waveguide bend of the second waveguide core includes a first curved section, a second curved section, and a second non-curved section connecting the first curved section with the second curved section.

10. The structure of claim 9 wherein the first non-curved section and the second non-curved section are substantially straight, and the first non-curved section and the second non-curved section are separated by the first gap.

11. The structure of claim 10 wherein the first non-curved section has a first length and the second non-curved section has a second length that is substantially equal to the first length.

12. The structure of claim 10 wherein the first non-curved section has a first length and the second non-curved section has a second length that not equal to the first length.

13. The structure of claim 1 wherein the first gap is filled by a dielectric material, and the first waveguide core and the second waveguide core are comprised of single-crystal silicon.

14. A structure comprising:
   a first waveguide core including a first section, a second section, a first waveguide bend connecting the first section with the second section, and a third waveguide bend connected with the second section of the first section of the first waveguide core, the first waveguide core having a first side surface extending about an outer radius of the first waveguide bend; and
   a second waveguide core including a first section, a second section, a second waveguide bend connecting the first section with the second section, and a fourth waveguide bend connected with the second section, the second waveguide core having a second side surface extending about an outer radius of the second waveguide bend,
   wherein the first waveguide bend is spaced from the second waveguide bend in a first non-contacting relationship with a first gap between the first side surface and the second side surface, and the first gap has a perpendicular distance selected to permit optical signal transfer between the first waveguide bend and the second waveguide bend, the third waveguide bend spaced from the fourth waveguide bend in a second non-contacting relationship by a second gap between the first side surface and the second side surface, and the second gap has a perpendicular distance selected to permit optical signal transfer from the first waveguide bend to the second waveguide bend.

15. The structure of claim 14 wherein the first waveguide bend and the third waveguide bend are curved in opposite directions, and the second waveguide bend and the fourth waveguide bend are curved in opposite directions.

16. A method comprising:
   patterning a layer with lithography and etching processes to form a first waveguide bend of a first waveguide core and a second waveguide bend of a second waveguide core,
   wherein the first section of the first waveguide core is substantially straight and aligned along a first longitudinal axis, the first section of the second waveguide core is substantially straight and aligned along a first longitudinal axis, the first longitudinal axis of the first waveguide core is substantially collinear with the first longitudinal axis of the second waveguide core, the first waveguide core has a first side surface extending about an outer radius of the first waveguide bend, the second waveguide core having a second side surface extending about an outer radius of the second waveguide bend, the first waveguide bend is spaced from the second waveguide bend in a first non-contacting relationship with a gap between the first side surface and the second side surface, and the gap has a perpendicular distance selected to permit optical signal transfer between the first waveguide bend and the second waveguide bend.

17. The method of claim 16 wherein the first waveguide bend and/or the second waveguide bend is patterned with the lithography and etching processes to include a plurality of segments arranged in a first curved arc.

18. The method of claim 16 wherein the first waveguide bend and/or the second waveguide bend is patterned with the lithography and etching processes to include a first curved section, a second curved section, and a first non-curved section connecting the first curved section with the second curved section.

* * * * *